(12) United States Patent
Fujiki et al.

(10) Patent No.: US 6,694,216 B1
(45) Date of Patent: Feb. 17, 2004

(54) CARRYING SYSTEM

(75) Inventors: Hiroshi Fujiki, Aichi (JP); Hiroki Sone, Kagamigahara (JP)

(73) Assignee: Murata Kikai Kabushiki Kaisha, Kyoto (JP)

( * ) Notice: Subject to any disclaimer, the term of this patent is extended or adjusted under 35 U.S.C. 154(b) by 0 days.

(21) Appl. No.: 10/382,839

(22) Filed: Mar. 7, 2003

(30) Foreign Application Priority Data

Mar. 8, 2002 (JP) ........................................ 2002-062845

(51) Int. Cl.⁷ ................................................ G06F 7/00
(52) U.S. Cl. ........................... 700/213; 700/228; 700/4; 700/9; 700/112; 700/113
(58) Field of Search ................................. 700/213, 228, 700/2, 4, 9, 112, 113, 121

(56) References Cited

U.S. PATENT DOCUMENTS 4,827,423 A * 5/1989 Beasley et al. .............. 700/96
5,372,241 A * 12/1994 Matsumoto .............. 198/465.4
6,073,054 A * 6/2000 Katayama et al. ............ 700/28
6,201,995 B1 * 3/2001 Ying ............................... 700/3

FOREIGN PATENT DOCUMENTS

JP        11-143522        5/1999

* cited by examiner

Primary Examiner—Khoi H. Tran
(74) Attorney, Agent, or Firm—Westerman, Hattori, Daniels & Adrian, LLP

(57) ABSTRACT

The present invention provides a large-scale carrying system that allows the operation of only a part of the system which has been completely constructed, while concurrently allowing the construction of a part of the system which has not been constructed yet. A carrying system comprises a carrying vehicle system 3 which carries an article to a predetermined location using a carrying vehicle, an article housing system 4 in which the article is temporarily housed for storage, an integrating controller 5 which integrally controls a system set 2 comprising at least one carrying vehicle system 3 and at least one article housing system 4, and an auxiliary controller 14 which can integrally manage at least part of the system set. The integrating controller 5 and the auxiliary controller 14 are connected together through a network. It is thus possible to transfer data on the part of the system set 2 which is integrally managed by the auxiliary controller 14, to the integrating controller 5.

4 Claims, 3 Drawing Sheets

CARRYING SYSTEM

FIELD OF THE INVENTION

The present invention relates to a carrying vehicle system which carries an article to a predetermined location using a carrying vehicle, an article housing system in which the article is temporarily housed for storage, and in particular, to the configuration of a carrying system that can be efficiently operated during system construction.

BACKGROUND OF THE INVENTION

A carrying system has hitherto been known which comprises a carrying vehicle system that carries an article to a predetermined location using a carrying vehicle, an article housing system in which the article is temporarily housed for storage, and an integrating controller that integrally manages these systems.

As the scale of such a carrying system becomes larger, more and more time is required to construct the whole system. Accordingly, it has been desirable that even when the carrying system as a whole is still being constructed, once the minimum arrangements that enable carrying operations have been constructed, at least this already constructed part of the system can be operated.

Further, in constructing the carrying system, defects are detected and eliminated by repeating operations of allowing the carrying vehicle system and the article housing system to be operated by the corresponding controllers, further allowing the integrating controller to integrally control and tentatively operate these systems to find defects or the like in a control program, correcting the control program, and operating the systems again. However, to operate even a part of the whole carrying system, the integrating controller must be operated. Then, the integrating controller operates both part of the whole system for which the control program has not been corrected and which is still being constructed and part of the system which has already been completed and confirmed to operate correctly. For the part of the system still being constructed, to correct defects in the control program, this program must be restarted. Then, the integrating controller must be stopped whenever the control program is restarted.

Further, if an error occurs in the part of the system still being constructed, the integrating controller may be stopped. When the integrating controller is stopped, disadvantageously the part of the system operating correctly is also stopped.

Furthermore, it becomes impossible to rewrite the data for the integrating controller being operated so that it can be used for tests. As a result, it is difficult to partly operate the carrying system.

Thus, the present invention provides a large-scale carrying system that allows the operation of only a part of the system which has been completely constructed, while concurrently allowing the construction of a part of the system which has not been constructed yet.

SUMMARY OF THE INVENTION

An object of the present invention is as described above. Now, description will be give of means for solving the problems.

That is, according to the invention, there is provided a carrying system comprising a carrying vehicle system which carries an article to a predetermined location using a carrying vehicle, an article housing system in which the article is temporarily housed, a system set comprising a plurality of system units each including at least one of the carrying vehicle system and the article housing system, an integrating controller which can control the whole system set, and an auxiliary controller which controls some of the system units of the system set, wherein the integrating controller controls the system set except for the system units controlled by the auxiliary controller.

According to the invention, carrying system further comprises a simulator set comprising a carrying vehicle controller simulator which simulates the carrying vehicle system and an article housing controller simulator which simulates the article housing system, and the simulator set is controlled by the auxiliary controller.

According the invention, the integrating controller and the auxiliary controller are connected together, and the auxiliary controller transfers a control program relating to the system units controlled by the auxiliary controller, to the integrating controller so that on the basis of the transferred control program, the integrating controller can control the system units which have been controlled by the auxiliary controller.

According to the invention, there is provided a system constructing method of constructing a carrying system comprising a carrying vehicle system which carries an article to a predetermined location using a carrying vehicle, an article housing system in which the article is temporarily housed, a system set comprising a plurality of system units each including at least one of the carrying vehicle system and the article housing system, and an integrating controller which can control the whole system set, wherein a part of the system set that has not been constructed yet is tested and adjusted using an auxiliary controller which tests and adjusts this part of the system unit without affecting a part of the system set operated by the integrating controller, and control of the tested and adjusted part of the system unit is transferred to the integrating controller.

DETAILED DESCRIPTION OF THE PREFERRED EMBODIMENTS

Figure 1:
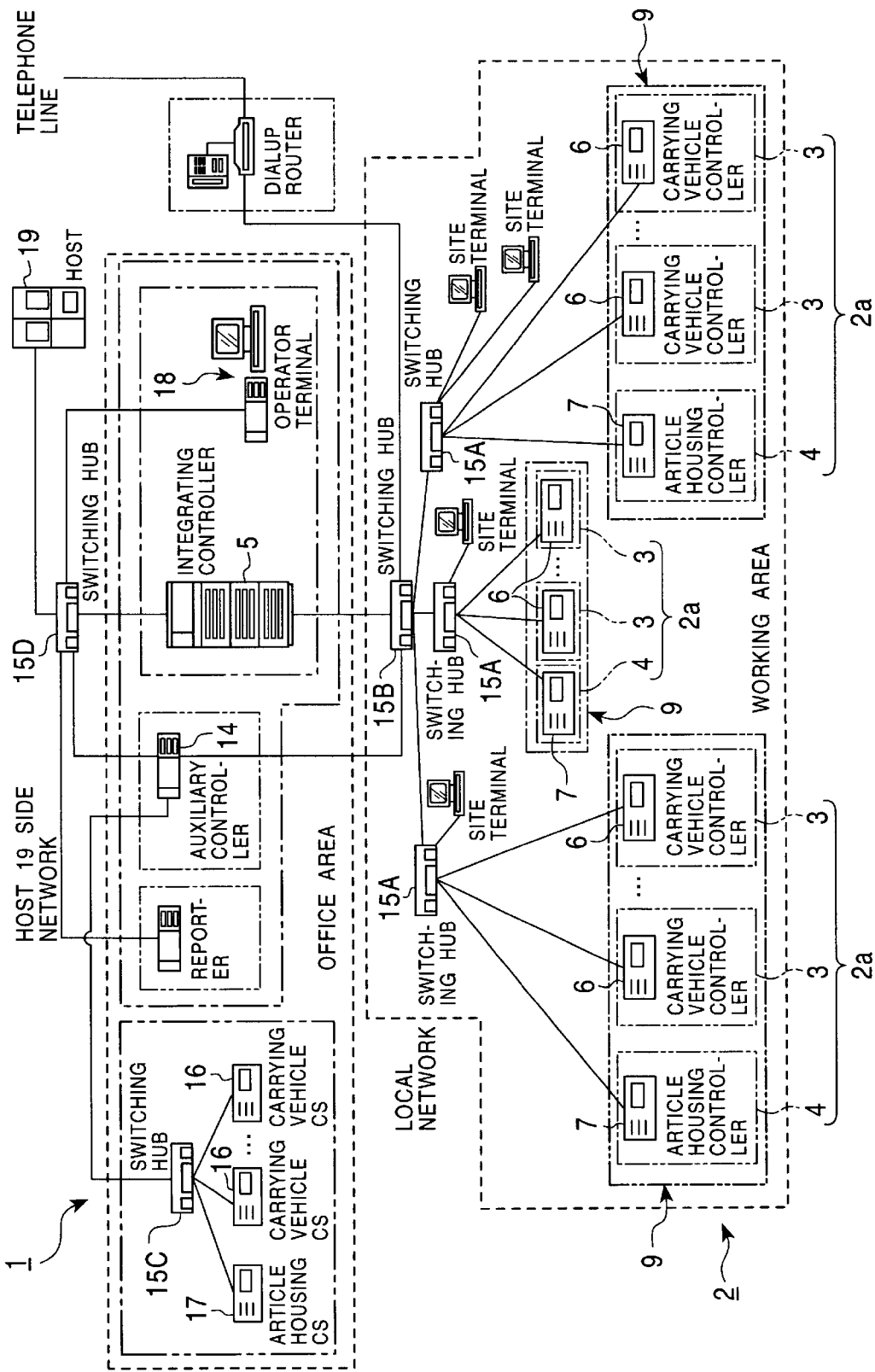
FIG. 1 is a schematic view showing a configuration of a computer system for a carrying system.

A carrying system 1, an embodiment of the present system, will be described with reference to FIGS. 1 and 2. The carrying system 1 is provided with at least one carrying vehicle system 3, at least one article housing system 4, and an integrating controller 5 that integrally manages these systems. The carrying vehicle system 3 carries articles such as cassettes in which semiconductor wafers or liquid crystal plates are housed to a predetermined location by using a carrying vehicle. The carrying vehicle system 3 comprises at least one carrying vehicle and a carrying vehicle controller 6 that manages operations of each carrying vehicle. The article housing system 4 temporarily houses articles for storage. It comprises at least one automatic warehouse 8 and an article housing controller 7 that manages operations of each automatic warehouse 8.

Each of the integrating controller 5, the carrying vehicle controller 6, and the article housing controller 7 is a computer apparatus comprising an input/output device, an arithmetic device (CPU), a storage device, and control devices for the respective devices.

As shown in FIG. 1, the integrating controller 5 is a higher controller, whereas the carrying vehicle controller 6 and the article housing controller 7 are lower controllers. The carrying vehicle controller 6 manages the carrying vehicle system 3. The article housing controller 7 manages the article housing system 4. The integrating controller 5 can integrally manage a system set 2 composed of the carrying vehicle system 3 and the article housing system 4 by managing the carrying vehicle controller 6 and the article housing controller 7 as a whole.

The carrying system 1 manages the carriage of articles in a working area in which the articles are processed or manufactured. The carrying system 1 according to the present embodiment can manage the carriage of articles in a plurality of working areas.

Figure 2:
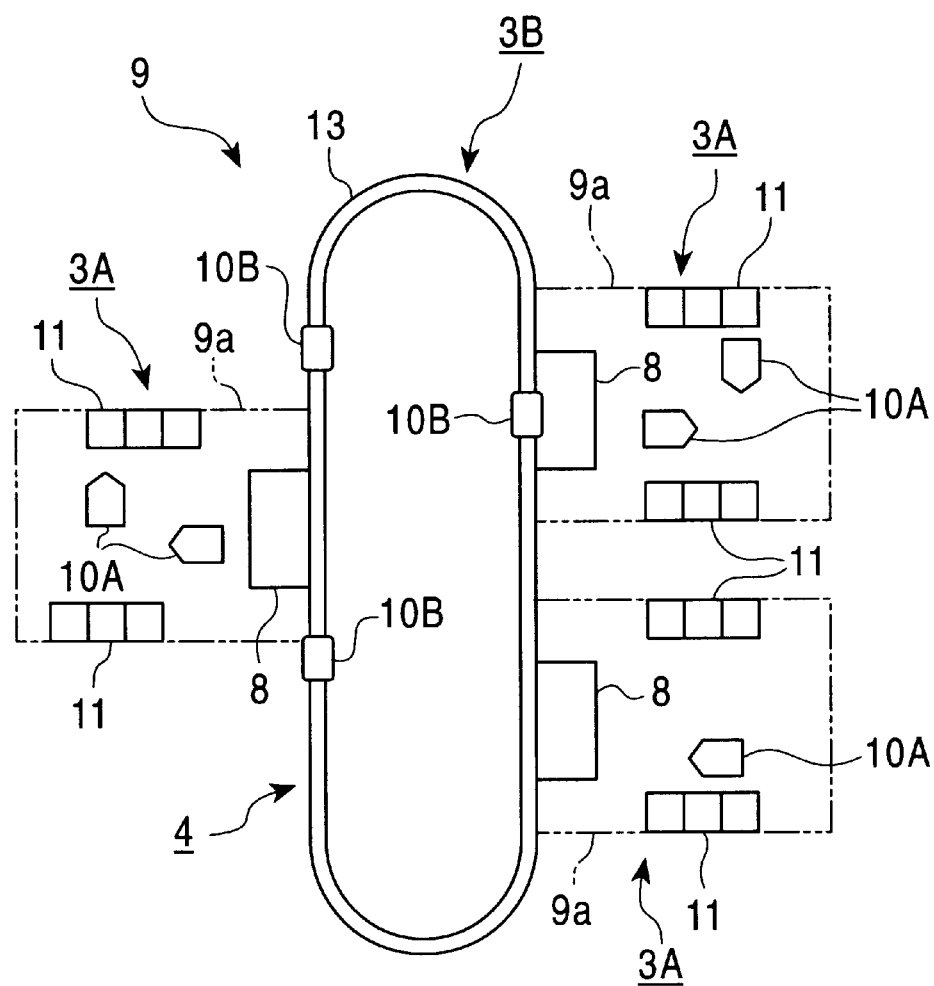
FIG. 2 is a schematic view showing a configuration of a system set in a working area.

FIG. 2 shows an example of the working area 9. Automatic warehouses 8, 8 are provided in the working area 9 to temporarily house articles for storage. Articles can be automatically loaded into, unloaded from, and stored in the automatic warehouses 8. The configuration of the automatic warehouse will be described later. Each of the automatic warehouses 8 is provided with a sub-working area 9a in which one step of the machining or manufacturing of articles is executed. A processing device 11 that executes the step of the machining or manufacturing of articles and intra-step carrying vehicles 10A, 10A are arranged within the sub-working area 9a. The intra-step carrying vehicle 10A carries each article stored in the automatic warehouse 8 to the processing device 11, which then processes the article. The intra-step carrying vehicle 10A carries the processed article again to the automatic warehouse 8. The automatic warehouses 8, 8 are connected together via a track 13. An inter-step carrying vehicle 10B running on the track 13 carries the article between the automatic warehouses 8, 8. Articles for which the machining operation of a certain step has been completed are stored in the automatic warehouse 8. However, to subject these articles to the machining operation of the next step, the inter-step carrying vehicle 10B carries each of these articles to the automatic warehouse 8 connected to the sub-working area 9s for the next step.

In the configuration according to the present embodiment, the carrying vehicle system 3 is composed of an intra-step carrying vehicle system 3A and an inter-step carrying vehicle system 3B. The intra-step carrying vehicle system 3A comprises at least one intra-step carrying vehicle 10A and an intra-step carrying vehicle controller 6A. The inter-step carrying vehicle system 3B comprises at least one inter-step carrying vehicle 1013 and at least one inter-step carrying vehicle controller 6B. Further, in the configuration according to the present embodiment, the article housing system 4 comprises at least one automatic warehouse 8 and at least one article housing controller 7.

In the configuration according to the present embodiment, one of the sub-working areas 9a of the working area 9 is provided with one article housing system 4, one inter-step carrying vehicle system 3B, and a plurality of intra-step carrying vehicle systems 3A. All systems present in the working area 9 are collectively referred to as a system unit 2a. The system unit 2a is not limited to the above configuration. The system unit has only to include at least one of the article housing system 4, the inter-step carrying vehicle system 3B, and the intra-step carrying vehicle system 3A.

As previously described, the system set 2 is composed of the carrying vehicle systems 3 and the article housing systems 4 as a whole. However, a part or the whole of the system unit 2 manages the carriage of articles in each working area. In the present embodiment, the system unit 2a is responsible for managing the carriage in each working area 9. The system set 2 as a whole can manage the carriage in a plurality of working areas. That is, the system set 2 is composed of a plurality of system units 2a.

Figure 3:
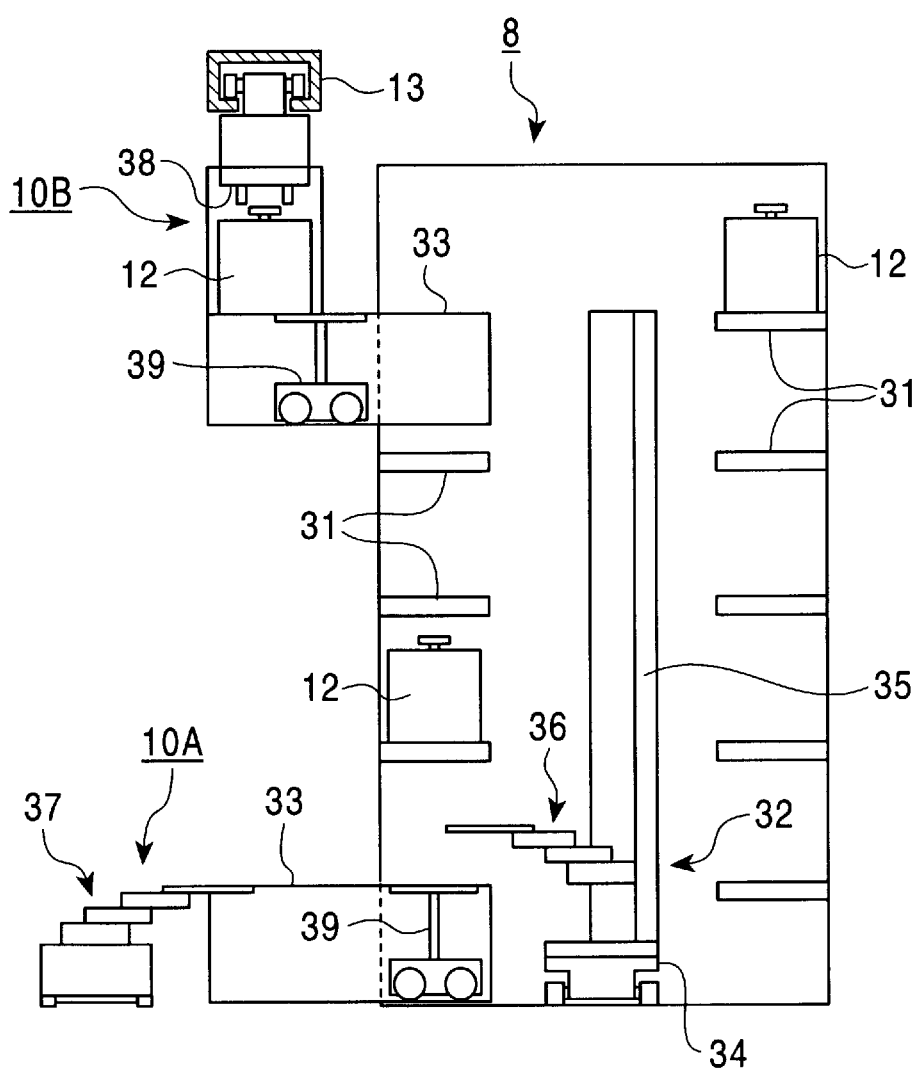
FIG. 3 is a schematic view showing a configuration of an automatic warehouse.

The automatic warehouse 8 will be described with reference to FIG. 3. The automatic warehouse 8 is provided with a large number of shelves 31, 31 on which articles 12 are housed and a stacker crane 32 used to place the articles 12 on the shelves 31. The shelves 31, 31 are arranged at both lateral sides of a running path of the stacker crane 32. The plurality of shelves 31, 31 are arranged in the vertical direction. The stacker crane 32 is provided with a mast 35 installed on a running carriage 34 so as to extend vertically and a transfer device 36 that can be moved up and down along the mast 35. The transfer device 36 transfers the article 12 by scooping it. Further, a conveyor 33 is arranged at a storage and retrieval port of the automatic house 8 so as to project laterally from the automatic warehouse 8. The article 12 inside the automatic warehouse 8 is moved to the exterior of the automatic warehouse 8 via the conveyor 33. The article 12 can thus be transferred to a carrying vehicle running outside the automatic warehouse 8. The conveyor 33 is provided with a placement carriage 39 on which the article 12 can be placed and which can run in a longitudinal direction of the conveyor 33.

In the automatic warehouse 8 according to the present embodiment, the conveyor 33 is provided at both top and bottom of the automatic warehouse 8. The lower conveyor 33 enables the article 12 to be transferred between the automatic warehouse 8 and the intra-step carrying vehicle 10A on a floor. Further, the upper conveyor 33 enables the article 12 to be transferred between the automatic warehouse 8 and the inter-step carrying vehicle 10B of a ceiling.

The intra-step carrying vehicle 10A is provided with a scooping type transfer device 37 of the same type as the transfer device 36. The transfer device 37 receives the article 12 from the automatic warehouse 8, then runs, and transfers it to the processing device 11. Once the article 12 has been completely processed, the intra-step carrying vehicle 10A receives the article 12 from the processing device 11. The intra-step carrying vehicle 10A then carries the article 12 to the automatic warehouse 8 again. Further, the inter-step carrying vehicle 10B is provided with a chuck mechanism as a transfer device 38 to grasp the article 12. The transfer device 38 can transfer the article 12 between the automatic warehouses 8, 8. The inter-step carrying vehicle 10B runs along the overhead track 13.

The carrying system 1 can be operated in the working area 9 once a system with the minimum arrangements (system unit 2a) which enables carrying operations has been constructed, even before the whole system set 2 has not been completed. That is, in the sub-working area 9a, if the control program has been completely corrected among the intra-step carrying vehicle system 3A, which can carry the article 12 within the sub-working area 9a, the inter-step carrying vehicle system 3B, which can carry the article 12 to another sub-working area 9a, and the article housing system 4, which temporarily stores the article 12 carried by the inter-step carrying vehicle system 3B before it is carried by the inter-step carrying vehicle system 3A so that the article 12 can be carried among these systems without creating any problems, then carrying operations can be started by operating this system unit 2a.

Here, it is assumed that in a factory that manufactures or processes the article 12, during construction, i.e. when the whole system set 2 of the carrying system 1 has not been completely constructed, the carrying system 1 is partly operated. In this state, the system set 2 includes the system unit 2a that has been completely constructed and the system unit 2a that has not been completely constructed. For the system unit 2a that has been completely constructed, the carrying vehicle system 3 and the article housing system 4 have been installed, and the correction of the control program and the like have been completed. Accordingly, this system unit 2a is operated correctly by the integrating controller 5. On the other hand, for the system unit 2a that has not been completely constructed, it is necessary to carry out the installing operation, the correction of the control program, and the like. In particular, to correct the control program, the carrying vehicle system 3 or the article housing system 4 is tentatively operated to find defects. Accordingly, when an error occurs, the controlling computer may be stopped. Further, restarting the control program may cause the computer to be stopped. If this computer is the integrating controller 5, an error may occur such as the stoppage of operation of the system unit 2a that has been completely constructed.

In the present invention, to avoid such errors, in addition to the integrating controller 5, an auxiliary controller 14 is provided as means for integrally managing the system set 2. The auxiliary controller 14 has functions similar to those of the integrating controller 5 through its processing ability is lower than the integrating controller 5. It can integrally control those of the system units 2a constituting the system set 2 which are not controlled by the integrating controller 5.

That is, the system unit 2a of the system set 2 which has been completely constructed is controlled by the integrating controller 5. On the other hand, the system unit 2a of the system set 2 which has not been completely constructed, is controlled by the auxiliary controller 14.

As shown in FIG. 1, in the present embodiment, in each system unit 2a, the carrying vehicle controller 6 and the article housing controller 7, the lower controllers, are connected to the integrating controller 5, the higher controller, via a network. The carrying vehicle controller 6 and the article housing controller 7 are also connected to the auxiliary controller 14 to form a local network. The term "local" is used relative to a host 19 side network, described later. In forming the network, for example, concentrators such as switching hubs 15A, 15B may be used as shown in FIG. 1, showing the present embodiment.

The local network is thus constructed with the auxiliary controller 14. Consequently, the integrating controller 5 can manage and control the system unit 2a of the system set 2 which has already been constructed. On the other hand, the auxiliary controller 14 can manage and control the system unit 2a of the system set 2 which has not been constructed yet.

As described above, in addition to the integrating controller 5, the auxiliary controller 14 is provided as a higher controller that integrally manages the system set 2. Accordingly, this carrying system 1 produces the effects described below. In constructing the carrying system 1, the integrating controller 5 can manage and control the system unit 2a of the system set 2 which has already been constructed. On the other hand, the auxiliary controller 14 can manage and control the system unit 2a of the system set 2 which has not been constructed yet. Thus, even if tests are carried out to allow for the construction of the system unit 2a that has not been constructed yet, it is possible to avoid affecting the system unit 2a which has already been constructed and is managed and controlled by the integrating controller 5, notably the programs managed and controlled by the integrating controller 5 as well as data required for control. As a result, once the system unit 2a that has not been constructed yet is completed, the control programs and the data required for management can be transferred to the integrating controller 5. Than, instead of completing and then operating the carrying system 1, it is possible to partly complete the carrying system 1 and operate only the completed part step by step, while testing and adjusting the incomplete part without affecting the operating part. Then, after the whole carrying system 1 has been completed, the auxiliary controller 14 functions as a controller for a simulator system, described later.

Now, with reference to FIG. 1, description will be given of the simulator system provided in the carrying system 1. The simulator system verifies the operation of a part or the whole of the system set 2 through computer simulation. The part of the system set 2 may be the single system unit 2a or a pair of the carrying vehicle system 3 and the article housing system 4, a system with the minimum arrangements.

The carrying system 1 of the present embodiment is provided with an article housing controller simulator 17 (in FIG. 1, expressed as the article housing CS) as a computer apparatus that simulates operations of the article housing system 4, as shown in FIG. 1. The carrying system 1 is also provided with a carrying vehicle controller simulator 16 (in FIG. 1, expressed as the carrying vehicle CS) as a computer apparatus that simulates operations of the carrying vehicle system 3. Furthermore, the auxiliary controller 14, which can integrally manage at least a part of the system set 2, is connected to each simulator through the network via a switching hub 15C so as to communicate with it, thus forming a simulator system. The auxiliary controller 14 can integrally manage the simulators. That is, the auxiliary controller 14 acts both as the previously described means for constructing the part of the system set 2 which has not been constructed yet and as means for integrally managing the simulators. In the present embodiment, the simulator system is configured so as to correspond to the system unit 2a. Thus, when the auxiliary controller 14 transmits various commands to the article housing controller simulator 17 and the carrying vehicle controller simulator 16, such results (data) are produced that it appears as if the system unit 2a actually carried the article.

As a result, the simulator system according to the present embodiment can correct or verify the programs for the carrying system 1 without performing an actual article carrying operation using the carrying vehicles 10A, 10B, provided in the carrying vehicle system 3, and the automatic warehouses 8, provide in the article housing system 4.

The effects described below are produced by configuring the simulation system using the auxiliary controller 14, which is different from the integrating controller 5, as described above. First, while operating the integrating controller 5 to perform an actual article carrying operation, the correction or verification of the programs for the carrying vehicle system 3 and the article housing system 4 can be simulated without affecting the integrating controller 5 being operated. If the integrating controller 5 performs both an actual carrying operation and a simulation operation, a program which has not been completely corrected may cause an error or the like during a simulating operation. This inconveniently causes the integrating controller 5 to be stopped. However, the previously described arrangements prevent such errors. Second, the auxiliary controller 14, which can perform a system constructing operation, is used while the integrating controller 5 is performing an actual article carrying operation. This eliminates the need to provide a separate computer that integrally manage the simulators of the simulation system.

Now, with reference to FIG. 1, description will be given of a network connection configuration of the integrating controller 5 and the auxiliary controller 14. As previously described, the integrating controller 5 is connected to the carrying vehicle system 3 and article housing system 4, comprising the system set 2, through the network via the switching hubs 15B, 15A. The auxiliary controller 14 is also connected to the carrying vehicle system 3 and article housing system 4, comprising the system set 2, through the network via the switching hubs 15B, 15A.

The carrying system 1 according to the present embodiment is provided with an operator terminal 18 and a host 19 as a computer apparatus, which act as means for controlling the integrating the controller 5. The integrating controller 5 and the operator terminal 18 are connected together via a switching hub 15D so as to communicate with each other. The integrating controller 5 and the host 19 are also connected together via the switching hub 15D so as to communicate with each other.

Further, the integrating controller 5 and the auxiliary controller 14 are connected together via the switching hub 15D as well as the switching hub 15B so as to transmit data between themselves. That is, the integrating controller 5, the operator terminal 18, the host 19, and the auxiliary controller 14 are connected to the network to form the host 19 side network.

With the above configuration, data possessed by the auxiliary controller 14 can be shared with the integrating controller 5. Thus, in the system set 2, the integrating controller 5 can integrally manage those parts of the system which have already been constructed. On the other hand, the auxiliary controller 14 can integrally manage those parts of the system which have not been constructed yet. Thus, data (programs) for parts that have been completely constructed can be sequentially transmitted from the auxiliary controller 14 to the integrating controller 5. That is, while commanding actual carrying operations in parts that have already been constructed, the integrating controller 5 sequentially loads parts that have been completely constructed to extend the range within which actual carrying operations can be performed. However, at this time, it is possible to prevent errors in actual carrying operations associated with system constructing operations.

As set forth in claim 1, a carrying system comprises a carrying vehicle system which carries an article to a predetermined location using a carrying vehicle, an article housing system in which the article is temporarily housed, a system set comprising a plurality of system units each including at least one of the carrying vehicle system and the article housing system, an integrating controller which can control the whole system set, and an auxiliary controller which controls some of the system units of the system set, and the integrating controller controls the system set except for the system units controlled by the auxiliary controller. Consequently, the auxiliary controller can control some of the system units of the system set. For example, even if the integrating controller operates some of the system units, while the auxiliary controller tests the remaining system units, possible defects in the system units being tested can be prevented from affecting the system units being operated. As a result, without waiting for all system units of the system set to operate correctly, some of the system units can be operated step by step, while the remaining system units can be constructed step by step. This enables manufacturing of products to be started earlier.

As set forth in claim 2, the carrying system further comprises a simulator set comprising a carrying vehicle controller simulator which simulates the carrying vehicle system and an article housing controller simulator which simulates the article housing system, and the simulator set is controlled by the auxiliary controller. Consequently, while operating the integrating controller to perform an actual article carrying operation, the correction or verification of the programs for the carrying vehicle system and the article housing system can be simulated without affecting the integrating controller being operated. Furthermore, the auxiliary controller, which can perform a system constructing operation, is used while the integrating controller is performing an actual article carrying operation. This eliminates the need to provide a separate computer that integrally manage the simulators of the simulation system.

As set forth in claim 3, the integrating controller and the auxiliary controller are connected together, and the auxiliary controller transfers a control program relating to the system units controlled by the auxiliary controller, to the integrating controller so that on the basis of the transferred control program, the integrating controller can control the system units which have been controlled by the auxiliary controller. Consequently, a control program required to control a certain system unit can be transferred from the auxiliary controller to the integrating controller. As a result, it is possible to smoothly transfer the control of set of system units that have been completely tentatively operated, from the auxiliary controller to the integrating controller.

As set forth in claim 4, there is provided a system constructing method of constructing a carrying system comprising a carrying vehicle system which carries an article to a predetermined location using a carrying vehicle, an article housing system in which the article is temporarily housed, a system set comprising a plurality of system units each including at least one of the carrying vehicle system and the article housing system, and an integrating controller which can control the whole system set, wherein a part of the system set that has not been constructed yet is tested and adjusted using an auxiliary controller which tests and adjusts this part of the system unit without affecting a part of the system set operated by the integrating controller, and control of the tested and adjusted part of the system unit is transferred to the integrating controller. Consequently, even if an error occurs when the auxiliary controller tests and adjusts the part of the system set which has not been constructed yet, it is possible to avoid affecting the part of the system set which is controlled by the integrating controller. Thus, the system set can be constructed step by step without affecting the part of the system set which is operated by the integrating controller.

What is claimed is:

1. A carrying system characterized by comprising a carrying vehicle system which carries an article to a predetermined location using a carrying vehicle, an article housing system in which the article is temporarily housed, a system set comprising a plurality of system units each including at least one of the carrying vehicle system and the article housing system, an integrating controller which can control the whole system set, and an auxiliary controller which controls some of the system units of the system set, and in that the integrating controller controls the system set except for the system units that are under controlled by the auxiliary controller.

2. A carrying system according to claim 1, characterized by further comprising a simulator set comprising a carrying vehicle controller simulator which simulates the carrying vehicle system and an article housing controller simulator which simulates the article housing system, and in that the simulator set is controlled by the auxiliary controller.

3. A carrying system according to claim 1, characterized in that the integrating controller and the auxiliary controller are connected together, and the auxiliary controller transfers a control program relating to the system units controlled by the auxiliary controller, to the integrating controller so that on the basis of the transferred control program, the integrating controller can control the system units which have been controlled by the auxiliary controller.

4. A system constructing method of constructing a carrying system comprising a carrying vehicle system which carries an article to a predetermined location using a carrying vehicle, an article housing system in which the article is temporarily housed, a system set comprising a plurality of system units each including at least one of the carrying vehicle system and the article housing system, and an integrating controller which can control the whole system set, the method being characterized in that:

a part of the system set that has not been constructed yet is tested and adjusted using an auxiliary controller which tests and adjusts this part of the system unit without affecting a part of the system set operated by the intergrating controller, and control of the tested and adjusted part of the system unit is transferred to the integrating controller.

* * * * *